United States Patent

Rydberg et al.

[11] Patent Number: 6,146,060
[45] Date of Patent: Nov. 14, 2000

[54] TOOL COUPLING AND METHOD FOR COUPLING TWO TOOL PARTS

[75] Inventors: Christer Rydberg; Jorma Koskinen, both of Fagersta, Sweden

[73] Assignee: Seco Tools AB, Fagersta, Sweden

[21] Appl. No.: 09/107,277

[22] Filed: Jun. 30, 1998

[30] Foreign Application Priority Data

Jun. 30, 1997 [SE] Sweden .................................. 9702500

[51] Int. Cl.[7] ...................................................... B23B 27/16
[52] U.S. Cl. ............................. 407/40; 407/101; 407/102; 407/103
[58] Field of Search ................................. 407/40, 46, 47, 407/48, 64, 103, 102, 101

[56] References Cited

U.S. PATENT DOCUMENTS

| | | | |
|---|---|---|---|
| 3,629,919 | 12/1971 | Trevarrow, Jr. ........................... | 407/103 |
| 5,555,784 | 9/1996 | Muendlein et al. ................. | 407/101 X |
| 5,682,803 | 11/1997 | Boianjiu . | |
| 5,810,518 | 9/1998 | Wiman et al. ........................... | 407/102 |
| 5,820,310 | 10/1998 | Boianjiu ............................... | 407/102 X |
| 5,931,613 | 8/1999 | Larsson .................................... | 407/103 |

FOREIGN PATENT DOCUMENTS

| | | | |
|---|---|---|---|
| 213925 | 12/1957 | Australia ............................... | 407/103 |
| 19 50 718 | 11/1970 | Germany . | |
| A1 34 46 455 | 6/1986 | Germany . | |
| 34 48 086 | 12/1991 | Germany . | |

Primary Examiner—Henry W. H. Tsai
Attorney, Agent, or Firm—Burns, Doane, Swecker & Mathis, L.L.P.

[57] ABSTRACT

A tool includes a cutting head and a holder, wherein the cutting head and the holder form two cooperating surfaces that are pressed together. The surfaces possess rows of alternating parallel grooves and ridges for locking the surfaces to each other. Each of the surfaces has two rows of grooves, one row oriented 90° relative to the other row. On one of the surfaces, some of the grooves of one row are in non-intersecting relationship with the grooves of the other row. On the other surface, the rows extend completely across one another, whereby the rows together form a waffle-like pattern. The cooperating surfaces allow at least four separate relative positions between the cutting head and holder.

6 Claims, 19 Drawing Sheets

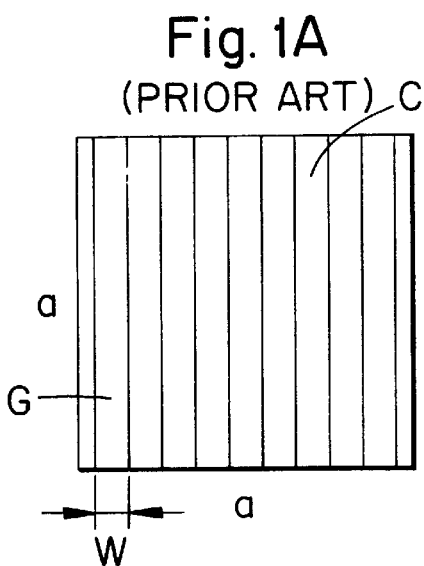
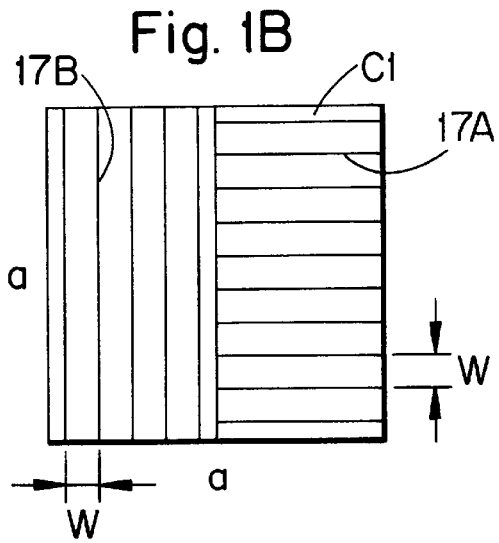
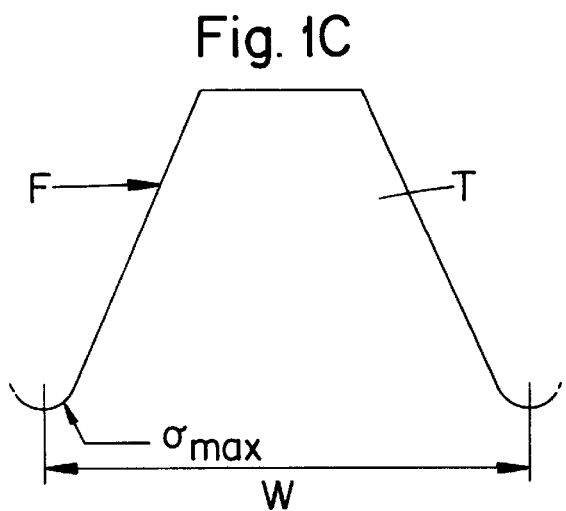
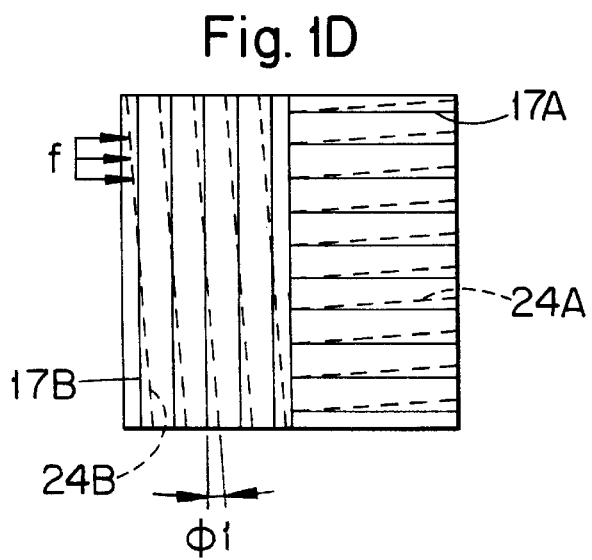
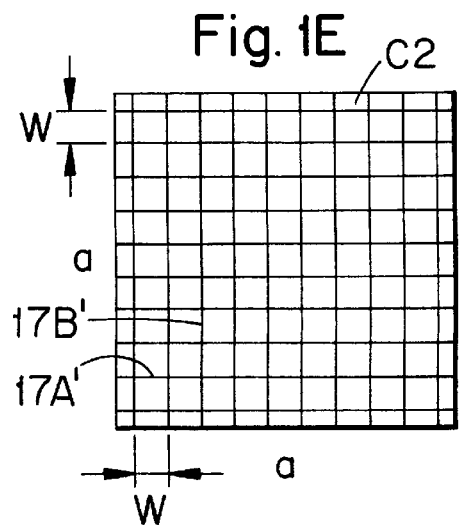

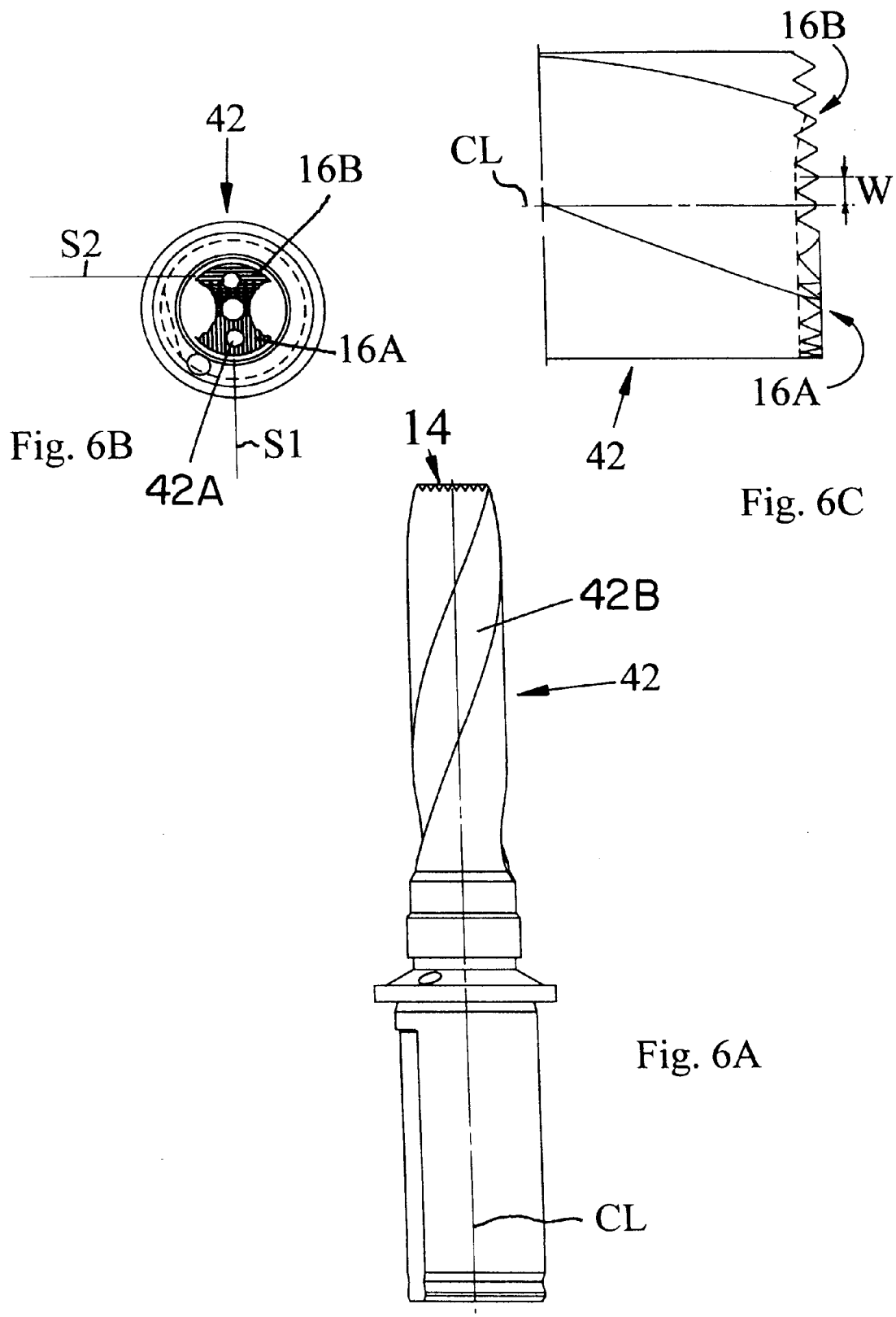

TOOL COUPLING AND METHOD FOR COUPLING TWO TOOL PARTS

BACKGROUND OF THE INVENTION

The present invention relates to a coupling, a tool, a cutting head, a holder, a shim and a method of coupling two tool parts together. In particular, the invention pertains to locking two tool parts together by a ridge-groove structure formed in opposing surfaces of the parts.

From German Document No. 34 46 455 there is previously known a turning tool having a coupling comprising two grooved surfaces forced together, whereby teeth of each surface enter grooves of the other surface to lock the surfaces together. The known tool has four teeth at the lower side of cutting insert which cooperate with corresponding grooves in the holder. The strain on each individual groove becomes large and the resulting wear leads subsequently to poor precision in the machining result. The same applies for a tool according to German Document C2-34 48 086 and German Document No. OS-19 50 718 which include radially projecting teeth.

Disclosed in U.S. Pat. No. 5,682,803 is another turning tool of the above type, wherein a lower side of a shim is provided with a fine pattern of protrusions intended to directly stamp a corresponding pattern into the holder during turning. Said stamping will however happen successively and therefore the screw which holds the cutting insert loses its clamping force and must be retightened. In addition the repetitive accuracy becomes bad when the shim is exchanged since it is almost impossible to find the original position again. Thus, a new stamping must be made whereby the locking effect deteriorates after each exchange.

Further reference is made to commonly owned U.S. application Ser. No. 08/849,616 (corresponding to Swedish Application 9404266-0) and U.S. application Ser. No. 08/945,908 (corresponding to Swedish Application 9501687-9), which show a tool with cooperating grooves and teeth provided in one direction.

OBJECTS OF THE INVENTION

One object of the present invention is to provide a universal coupling for two tool parts, whereby a great torque can be transferred.

Another object of the present invention is to provide a tool which is continuously rigid.

Still another object of the present invention is to provide a tool with good precision.

Still another object of the present invention is to provide a holder and a cutting head which are simple to assemble.

SUMMARY OF THE INVENTION

These and other objects are achieved by a chip removing machine device comprising first and second parts having first and second support surfaces, respectively, facing one another. Each of the first and second support surfaces includes a plurality of rows of alternating parallel grooves and ridges. The grooves of one of the rows are oriented non-parallel with respect to grooves of another of the rows. The first and second support surfaces are pressed together such that the rows of the first support surface mesh with respective rows of the second support surface. The first and second parts are positionable against one another in a number of relative positions, the number being at least four. Each of the rows contains a number of grooves greater than the number of relative positions. The first support surface has the rows thereof arranged such that at least some of the grooves of one of the rows are in non-intersecting relationship to the grooves of another of the rows.

Preferably, each of the first and second support surfaces has two row of grooves and ridges, and those two rows are oriented perpendicularly to one another. Preferably, the second support surface has the rows thereof extending substantially completely across one another, whereby the two rows together form a generally waffle like pattern.

Preferably, the first part comprises a holder, and the second part comprises a cutting head mounted on the holder.

The present invention also pertains to the cutting head per se, and to the holder per se, as well as to a shim which can be interposed between the cutting head and holder, and to a method of coupling first and second tool parts together.

DESCRIPTION OF THE DRAWINGS

The objects and advantages of the invention will become apparent from the following detailed description of preferred embodiments thereof in connection with the accompanying drawings in which like numerals designate like elements, and in which:

FIG. 1A schematically shows a known coupling surface;

FIG. 1B schematically shows a coupling surface according to the present invention;

FIG. 1C shows an area between two V-grooves;

FIG. 1D schematically shows a coupling surface according to the present invention in an unloaded and biased condition.

FIG. 6A is a side view of an alternative embodiment of a drill holder;

FIG. 6B is a top view of the drill holder of FIG. 6A;

FIG. 6C is an enlarged fragmentary side view of the drill holder of FIG. 6A;

DETAILED DESCRIPTION OF PREFERRED EMBODIMENTS OF THE INVENTION

Figure 2A:
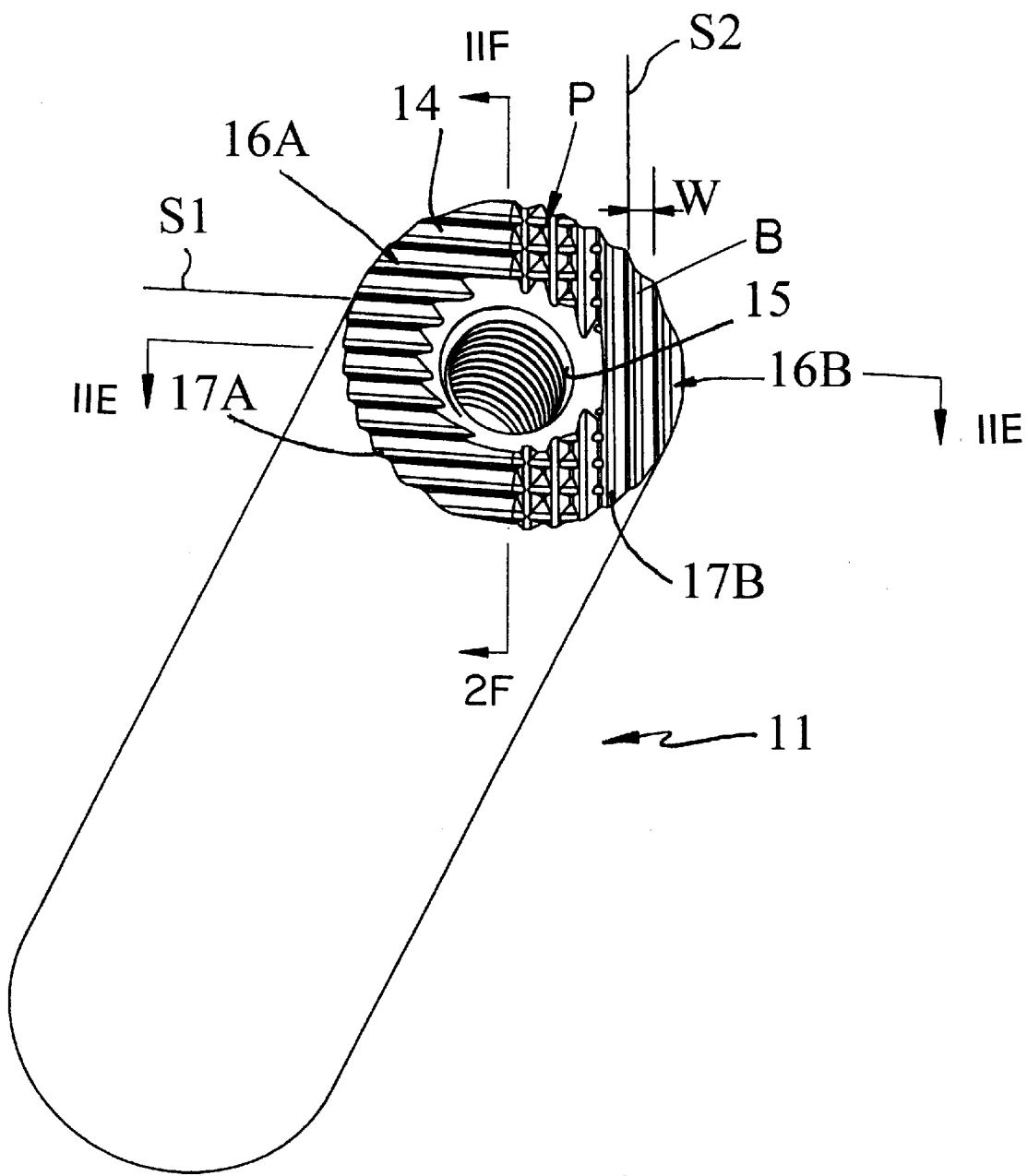
FIG. 2A shows a holder according to the present invention in a perspective view.

A) Technical analysis of transferred torques in couplings

Hereinafter follows a technical analysis of a theory behind the present invention. Look at a prior art tool part having a square surface C with sides having a length a and which has N number of milled, longitudinally parallel grooves G, each groove having a width or partition W, see FIG. 1A. Teeth are formed between adjacent grooves. If that surface were pressed against another part having an opposite surface with similar grooves it is assumed that for an individual groove a relative torsion (turning) can be made between the parts within a certain angle $\phi 1$. This can be said to be the measure of the gap (clearance) between the ridges of one part and the grooves of the other part due to normal manufacturing tolerances. When N grooves simultaneously influence each other a cooperation is obtained which reduces the total relative torsion inverted proportionally with the number of grooves whereby the total relative torsion is defined as:

$\phi 1/N$

Now look at a similar surface C1 having N/2 grooves 17B milled along half the length, a/2 (see FIG. 1B). On the other half there are N grooves 17A with the same profile and partition as above but milled 90° in relation to the other grooves. When another part with an opposite surface C2 having N grooves 17A' and N grooves 17B' oriented 90° relative to each other to form a waffle-like pattern (see FIG. 1E) is pressed against the surface C1, an engagement is attained between total N+N/2 grooves. If the relative torsion for a groove is, as before, $\phi 1$, then, the total relative torsion obtained is defined as $\phi 1/(N+N/2)=2\phi/3N$ That is, the total torsion/movement in this coupling is 33% smaller than in the prior art connection.

Look at a profile of a ridge or tooth T between two grooves according to FIG. 1C. The strain on a flank will lead to a maximum tension at the radius which becomes dimensioning for how much load the coupling can carry (or in other words maximum transferable torque). Since the profile extends in the depth direction the tension will depend on strain per length unit, i.e. the longer the flank distance that a given load can be distributed on, the lower the tension becomes. The spread of the load is in turn dependent of the relative torsion between the both parts of the joint.

An ideal coupling has contact along the entire groove in all grooves. But in practice one knows that contact will arise along the verge of the surfaces during torsional load, see FIG. 1D. The extension of the load is therefore directly dependent on the relative torsion in the coupling. For a given torque the tension in the profile will therefore change proportionally to the relative torsion in the coupling. If the maximum tension in the profile is σ max it is calculated for a strain f(N/mm) according to $\sigma max=f*c$ Where the function c depends on material and on the profile geometry.

For a given torque m and x number of flanks (the same in FIGS. 1A and FIGS. 1B, i.e., 2n and 2(n/2)+n), respectively, then f is proportional to $\phi$, i.e.:

$f~\phi$

The coupling in FIG. 1B can, in other words, transfer a torque which is $1/(2/3)*100\%=50\%$ bigger than the coupling in FIG. 1A.

B) Preferred embodiments

Said theoretical reasoning constitutes the basis for a number of embodiments of the invention, of which some are described hereinafter.

FIGS. 2A to 2D shows a tool 10 for milling including a substantially cylindrical holder 11, a multi-edged cutting head 12 and a screw 13. The holder 11 can be made of steel, cemented carbide or high speed steel. One free end of the holder 11 is intended to be fastened in a rotatable spindle (not shown) in a milling machine while the opposed second free end comprises a front surface 14 and a threaded hole 15. The threaded hole 15 has a conical entering bevel. The front surface 14 has a circular basic shape and comprises first and second rows of grooves 16B, 16A. Each groove row covers substantially half the front surface 14 and comprises a number of separate, identical flutes or grooves 17A, 17B. The grooves in the groove rows have two main directions S1, S2, which are perpendicular to each other. The second groove row 16A is bordered by the first groove row 16B. Each groove 17B in the first groove row 16B intersects the jacket (peripheral) surface of the holder in two places, while substantially each groove 17A in the second groove row 16A intersects the jacket surface of the holder in one place. Each groove 17A, 17B is substantially V-shaped in cross-section, whereby the groove width becomes progressively larger in an axially outward direction and defines a largest width W. The width W is in the magnitude of 0.2 to 2 mm, preferably around 1.5 mm. Each groove is formed between adjacent ridges or teeth which form flanks of the groove. Each flank connects, via a sharp or rounded transition, to a groove bottom surface B. The flanks form an acute angle with each other. The angle lies in the interval 40° to 80°, preferably 55° to 60°. Each bottom surface B is preferably planar and connects to the associated flank via an obtuse inner, soft or sharp, transition. The number of grooves in each groove row depends on how the cutting head support surface is formed and the number is chosen in the interval 5 to 20 grooves. The groove bottom could alternatively be concavely curved with a radius of about 0.2 to 0.4 mm. The design of the groove rows 16A, 16B produces a considerably bigger specific surface than if the surface 14 were planar. The groove rows 16A, 16B cover at least 80%, preferably 90–100%, of the accessible area of the front surface 14.

In the embodiment shown in FIGS. 2A–2D the first groove row 16B has been made, through hobbing or grinding, with a feed direction parallel with a direction S2. Subsequently the second groove row 16A has been machined with the same tool in direction parallel with a direction S1. To obtain full depth in each groove 17A in the second groove row 16A it is appropriate that the tool is fed somewhat into the first groove row 16B. Then said tool will also machine material of the first groove row 16B, which appears from for example FIG. 2A, wherein completely or partly pyramid shaped projections P are formed when the second groove row 16A intersects the first groove row 16B. In the shown embodiment the grooves 17A of the first groove row 16A which lie on opposite sides of the hole 15 are parallel to one another and thus constitute separate grooves. In contrast, the hole 15 bisects some of the grooves 17B of the first groove row 16B whereby the groove segments located on opposite sides of the hole constitute spaced segments of the same grooves. Consequently the second groove row 16A comprises twelve grooves 17A while the first groove row 16B comprises six grooves.

Figure 2B:
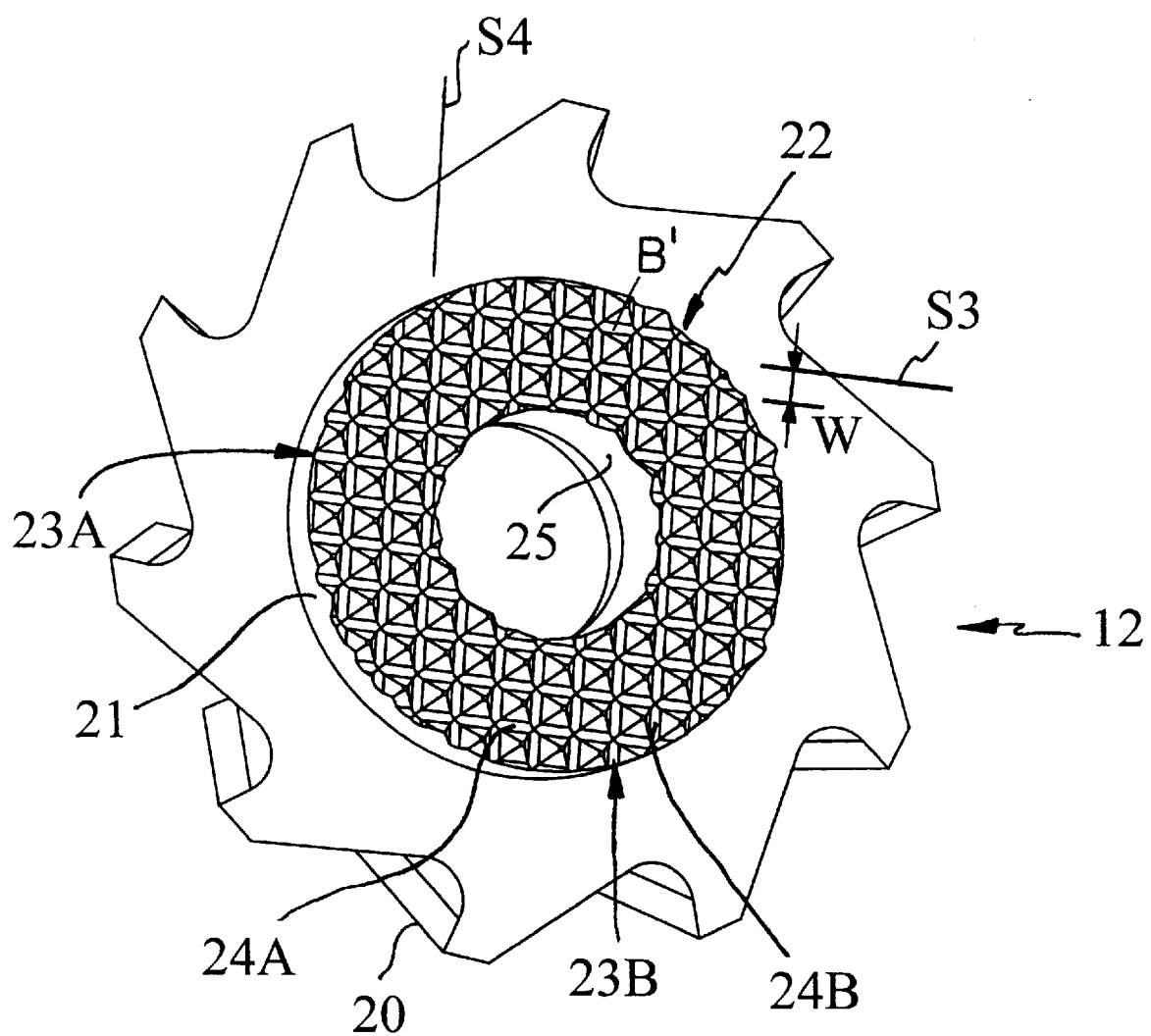
FIG. 2B shows a cutting head for milling according to the present invention in a perspective view.
Figure 2C:
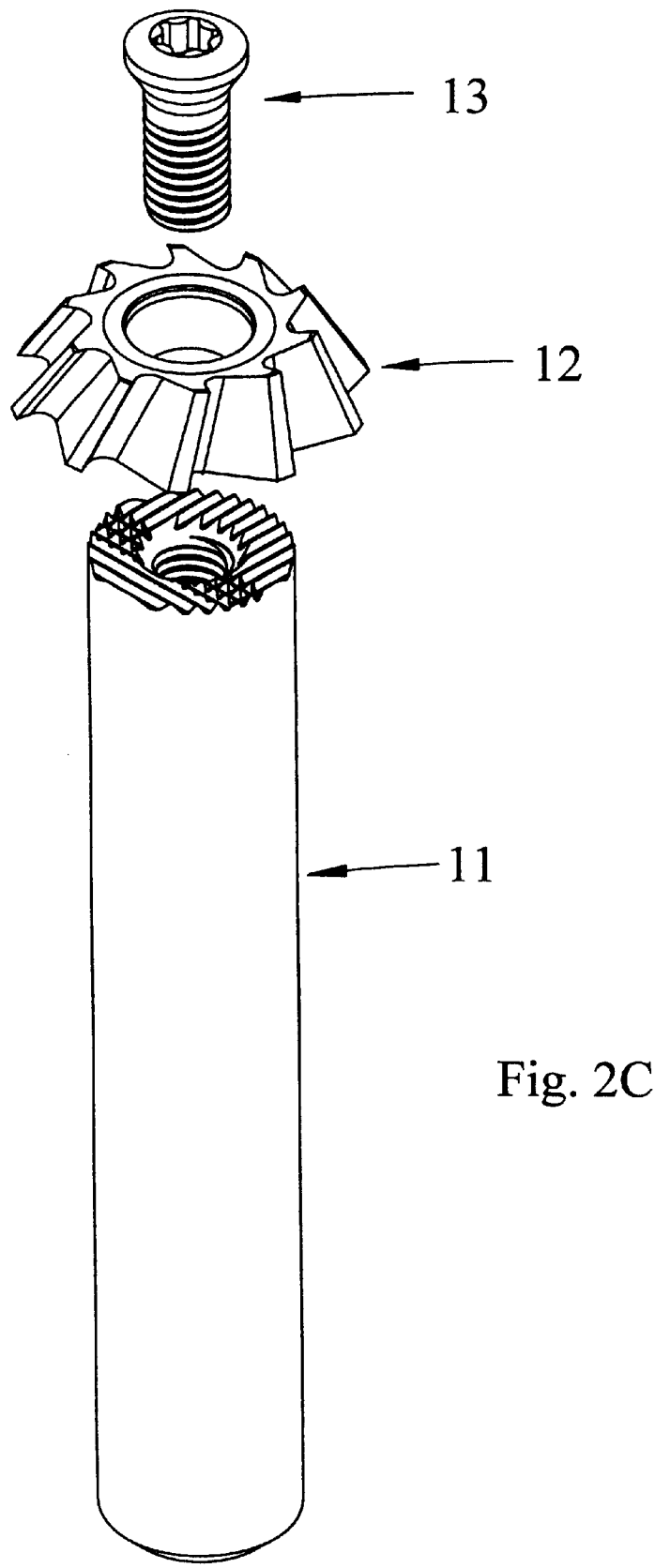
FIG. 2C shows a tool for milling according to the present invention in an exploded view.
Figure 2D:
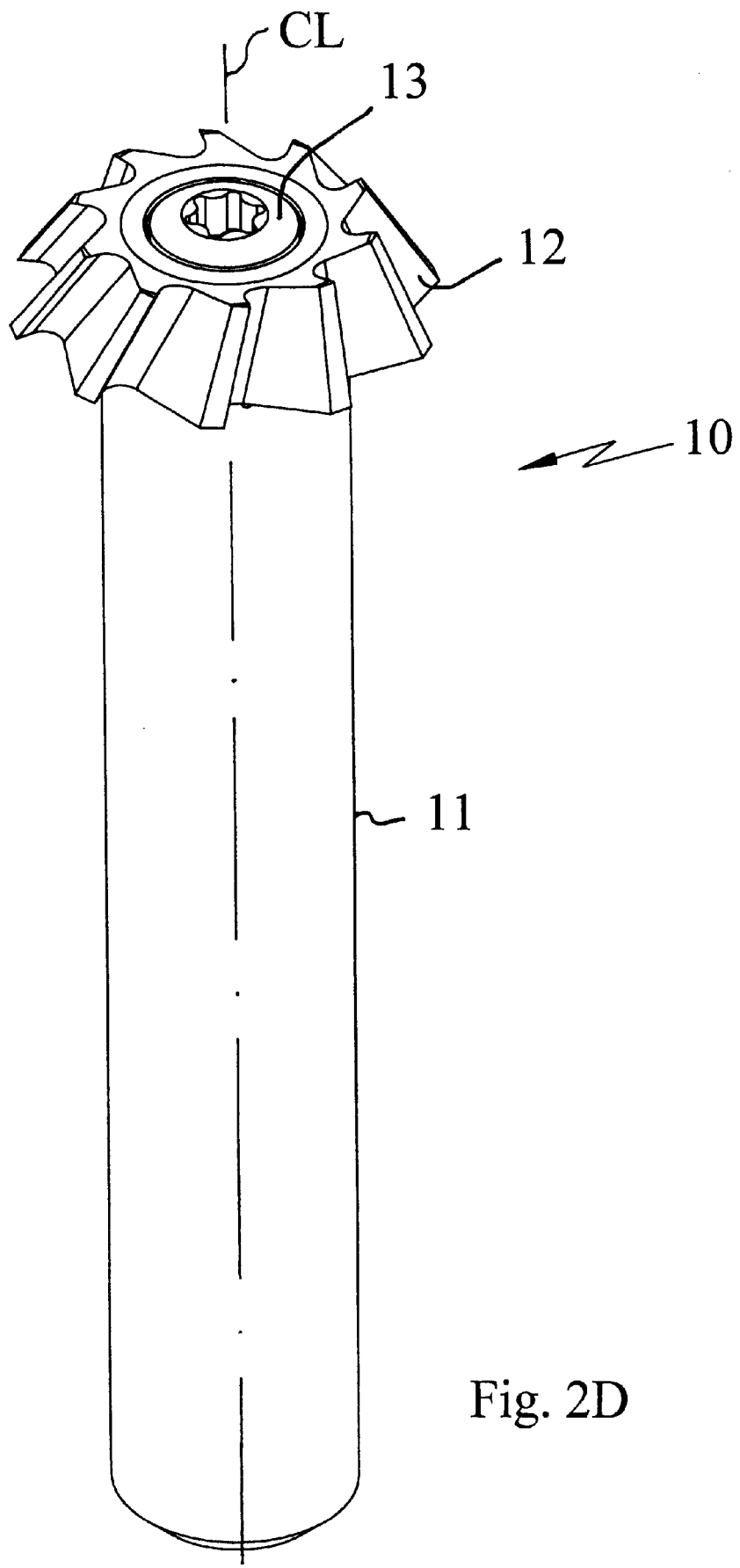
FIG. 2D shows the milling tool of FIG. 2C in an assembled, perspective view.
Figure 2E:
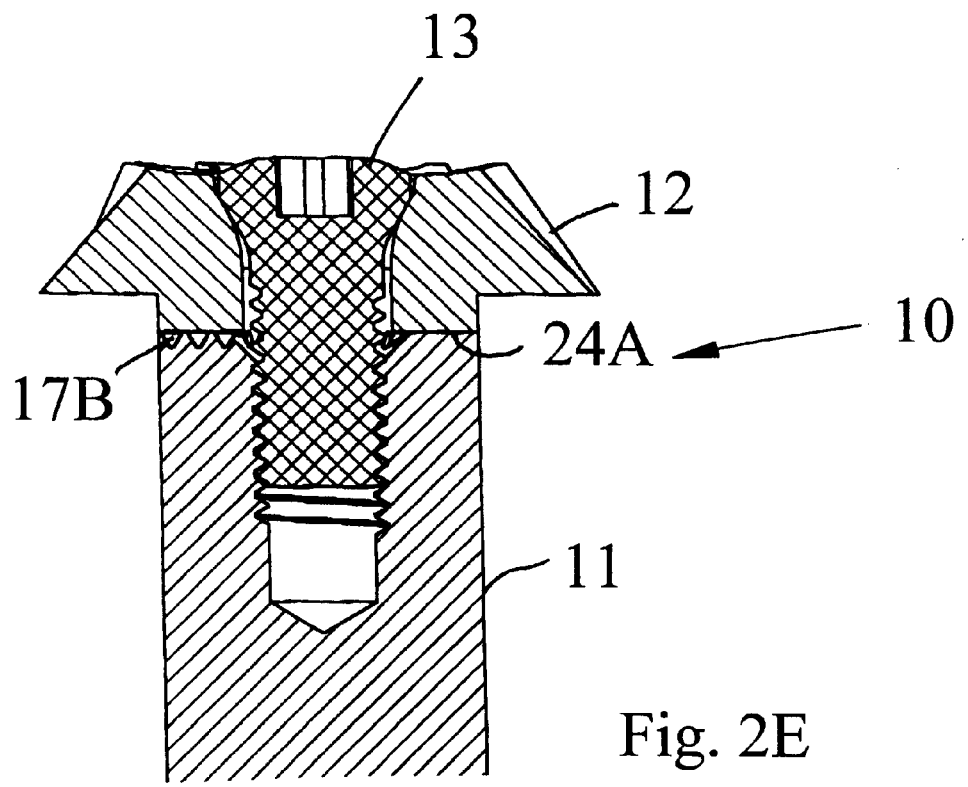
FIGS. 2E and 2F show cross sections corresponding to lines IIE—IIE and IIF—IIF in FIG. 2A.
Figure 2F:
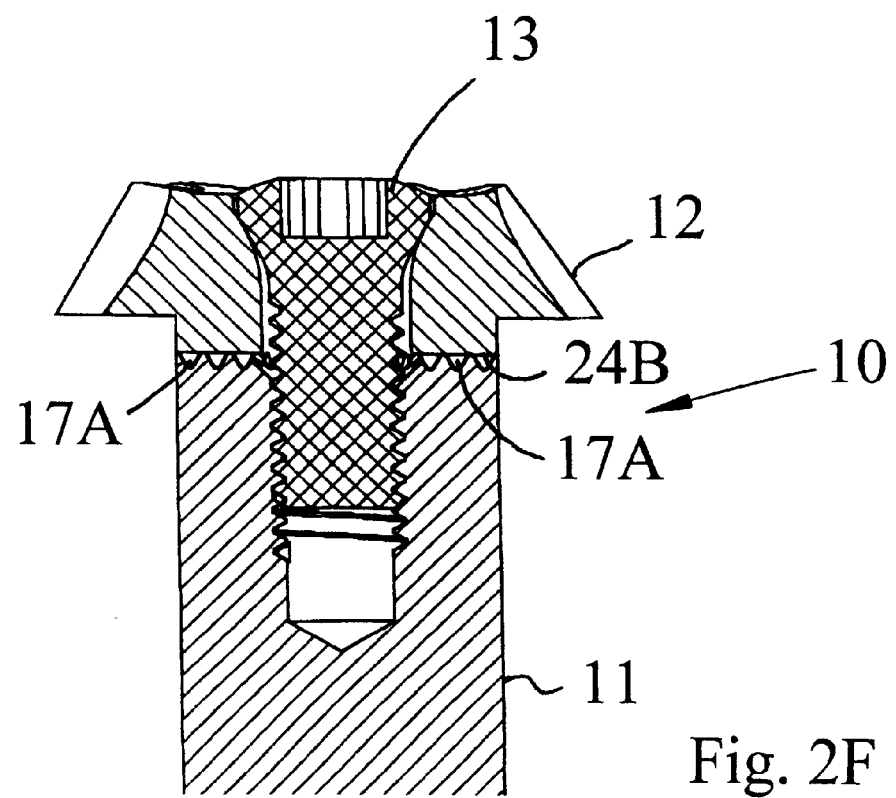

In FIG. 2B the cutting head 12 is shown in a perspective view from below. The head can be made from cemented carbide, cermet or high speed steel and can be used for milling dove tail slots. The head has the basic shape of a truncated cone and comprises ten cutting edges 20, which are provided at the periphery of the conical head. The cutting edges are surrounded by conventional chip and clearance surfaces as well as chip spaces. The head has an integral neck 21 forming a cylindrical jacket surface and a support surface 22. The support surface 22 has a circular basic shape and comprises two groove rows 23A, 23B. Each groove row covers substantially the entire support surface 22 and comprises a number of separate, identical flutes or grooves 24A, 24B. The grooves in the groove rows have two respective main directions S3, S4, which are perpendicular to each other. The groove rows 23A, 23B in the cutting head 12 wholly traverse each other, i.e. each groove extends across essentially the entire support surface 22 except where a hole 25 is disposed. There thus results a waffle pattern. Each groove 24A, 24B intersects the jacket surface of the neck 21 at two places. Each groove 24A, 24B is substantially V-shaped in cross-section and has a largest width W and a depth. Each groove is formed between adjacent ridges which form flanks of the groove. Each flank connects via a sharp or rounded transition, to a bottom surface B. The flanks form an acute angle with each other. The angle lies in the interval of 40° to 80°, preferably 55° to 60°. Each bottom surface B' is preferably planar and connects to the associated flank via an obtuse inner, soft or sharp, transition. The number of grooves in each groove row depends on how the front surface of the holder is formed and the number is chosen in the interval of 5 to 20 grooves. The bottom may alternatively be concavely curved and described by a radius of about 0.2 to 0.4 mm. The design of the groove rows 23A, 23B produces a considerably larger specific surface than if the support surface 22 were planar. The groove rows 23A, 23B cover at least 80%, preferably 90 to 100%, of the accessible area on the support surface 22. The groove rows 23A, 23B are displaced relative to the tool's axis of rotation CL by a distance W/2, whereas the groove rows 16A and 16B of the holder 11 are not so displaced. Thus, it is ensured that the ridges of the holder enter the grooves of the cutting head, and vice-versa, to keep the axis CL straight. The head has an unthreaded hole 25 to receive a screw or other suitable clamping means.

The clamping means may alternatively be developed as an internal pull rod, wherein the hole 25 comprises an integral thread which cooperates with a threaded free end of the pull rod. That alternative design provides the possibility to provide cutting edges towards the rotational axis for drilling. In FIG. 2B the groove rows 23A, 23B have been made through direct pressing and sintering, or through grinding.

The milling tool 10 is mounted by manually placing the support surface 22 of the cutting head 12 against the front surface 14 of the holder 11 in one of four possible positions. Thus, the groove direction S3 is aligned with one of the directions S1, S2, and the groove direction S4 is aligned with the other of the directions S1, S2. The screw 13 is brought through the insert hole 25 and against the threaded hole 15. Upon rotation of the screw 13 via a key which is in engagement with the key grip, the cutting head will be drawn firmly against the front surface, i.e. the position according to FIG. 2D has been achieved. The cutting head 12 is now anchored in the holder 11 in a satisfactory manner.

The reason that only one of the surfaces 14, 22 i.e., the support surface 22, has a waffle pattern over its entire area is that the tool obtains a more distinct locking effect than if both of the surfaces 14, 22 had a waffle pattern.

Figure 3A:
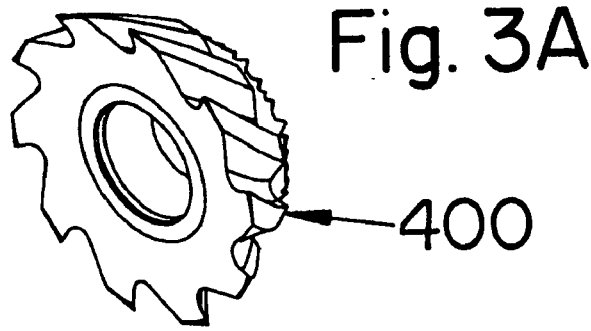
FIG. 3A is a perspective view of a second type of cutter embodying the invention.
Figure 3B:
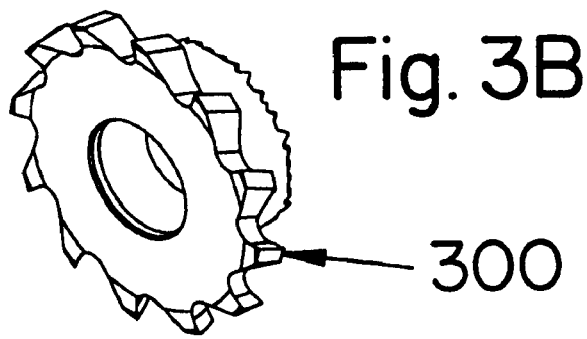
FIG. 3B is a perspective view of a third type of cutter embodying the invention.
Figure 3C:
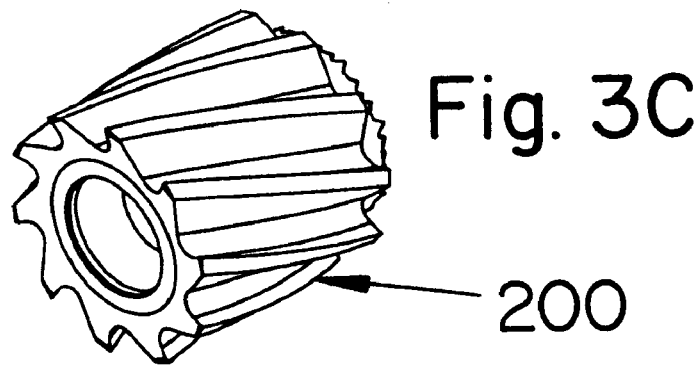
FIG. 3C is a perspective view of a fourth type of cutter embodying the invention.
Figure 3D:
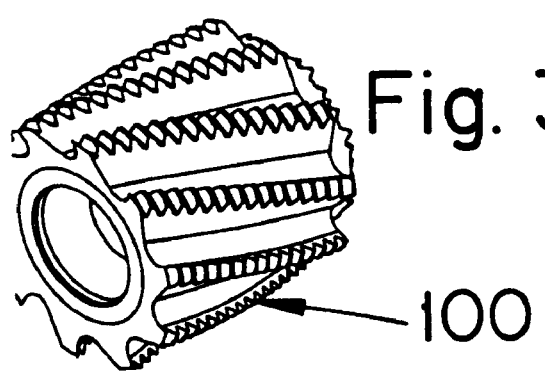
FIG. 3D is a perspective view of a fifth type of cutter embodying the invention.

When the cutting head 12 shall be exchanged the mounting process is reversed, whereafter the cutting head can be removed from the holder 11 and exchanged. This enables the cutting head geometry to be exchanged with some of the embodiments shown in FIGS. 3A–3D, which all fit the same holder. In FIG. 3D there is shown a chip dividing cylindrical end mill head or thread milling cutter 100; in FIG. 3C there is shown a chip non-dividing cylindrical head 200 for example for end mill cutting or reaming; in FIG. 3B there is shown a head 300 for grooving; and shown in FIG. 3A is a truncated conical head 400 for end mill cutting of dove tail slots, the latter having a cone apex directed towards the holder. Common for all these tools is that they replace conventional end mills in high speed steel where smaller dimensions (5 to 15 mm in diameter) often are desirable.

Figure 4:
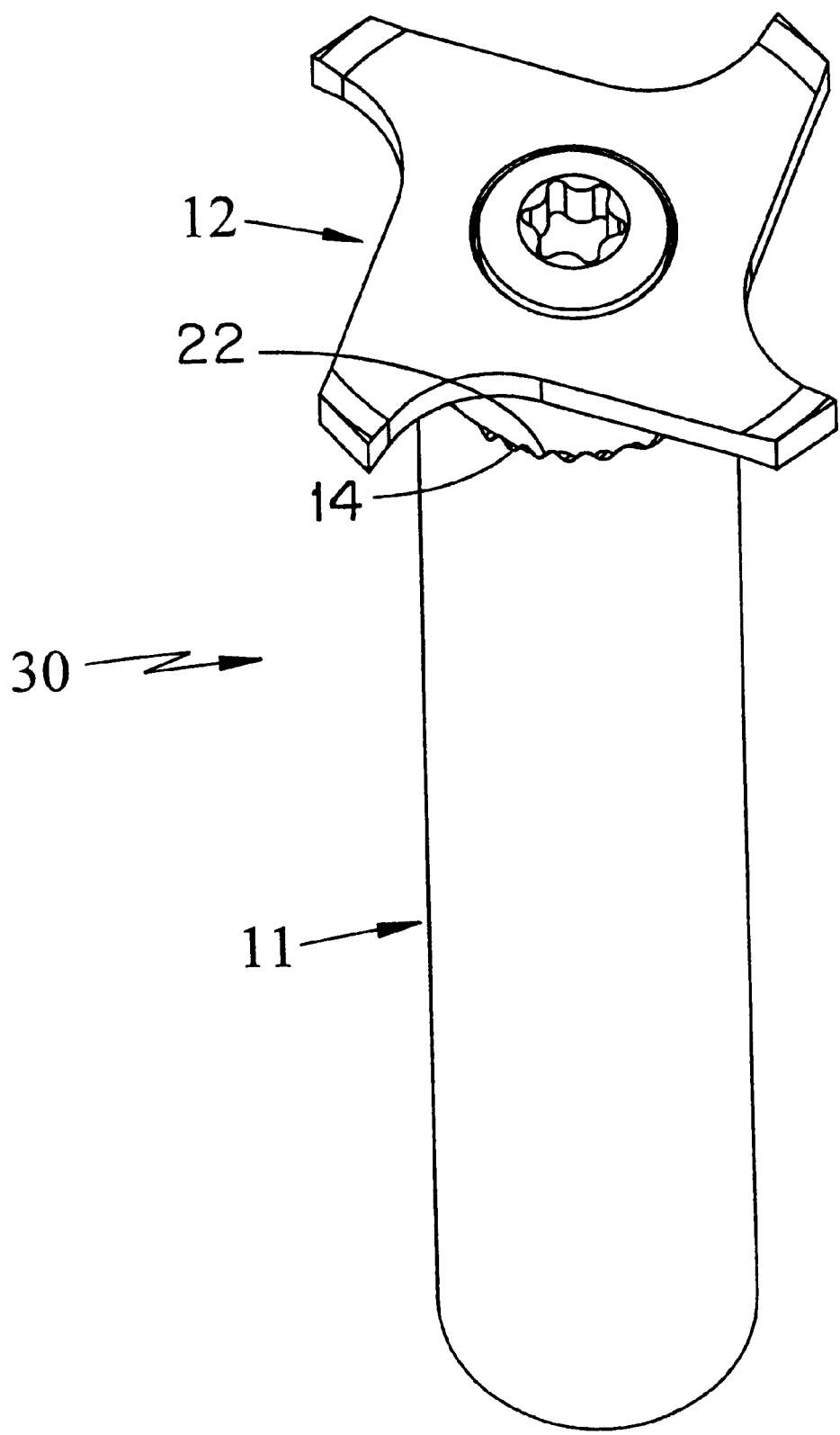
FIG. 4 shows an alternative embodiment of a tool according to the present invention in a perspective view, the tool being usable either for milling or turning.
Figure 5C:
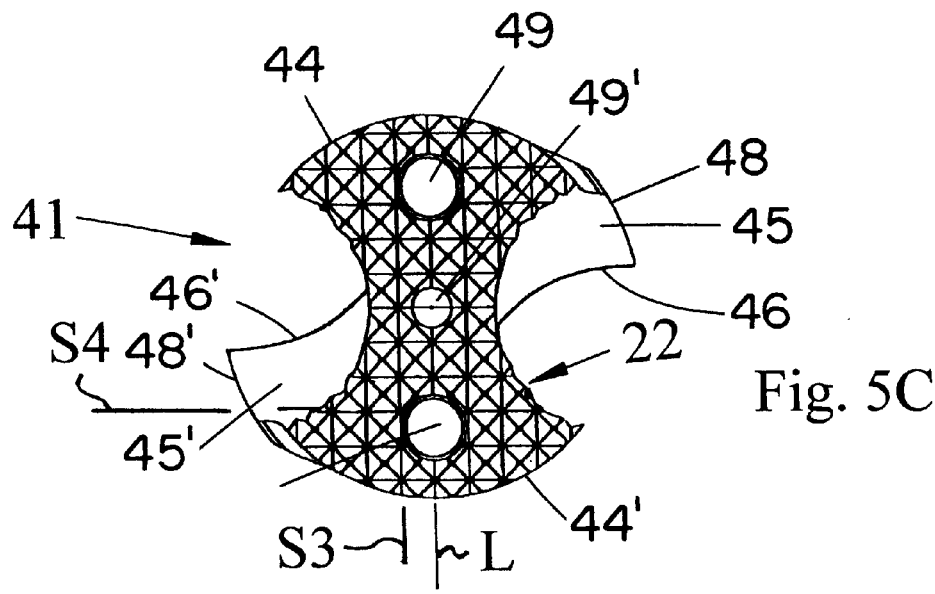
FIG. 5C is a bottom view of the cutting head of FIG. 5A.
Figure 5B:
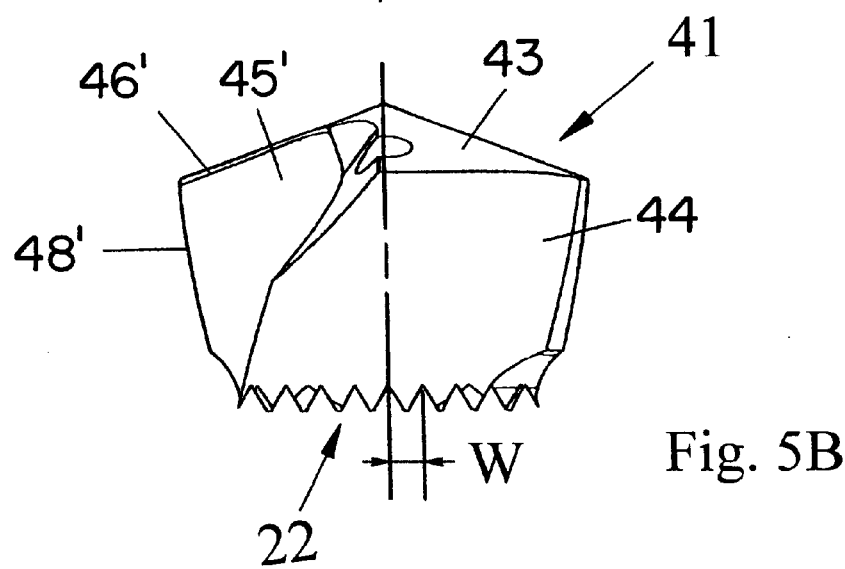
FIG. 5B is a side view of the cutting head of FIG. 5A turned 90 degrees.
Figure 5A:
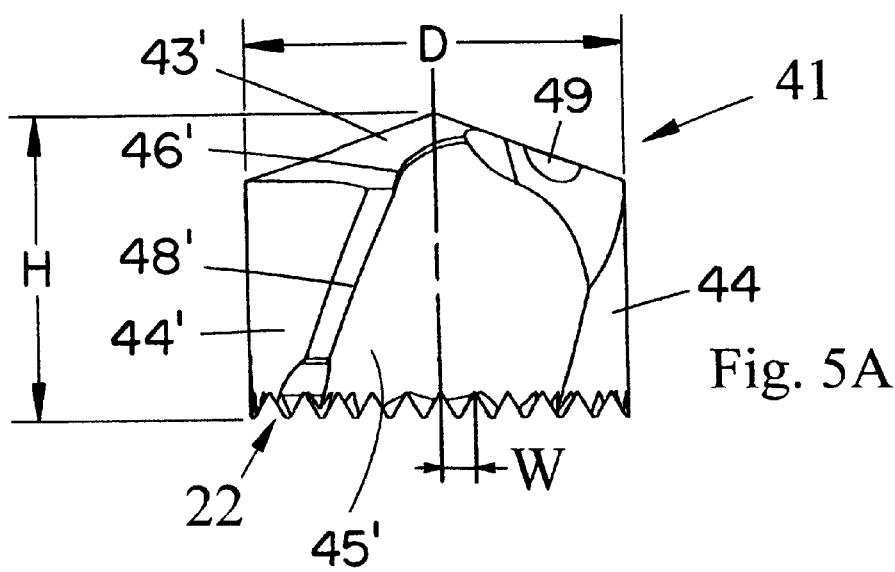
FIG. 5A is a side view of a cutting head according to another embodiment of the invention.

FIG. 4 shows a milling tool for grooving or a grooving tool 30, wherein the holder 11 and the cutting head 12 comprise a front surface and a support surface 14, 22 respectively, such as described above. In case the tool shall be used for milling then only one position relative to the cooperating surfaces is needed, since the cutting head 12 would be rotating. If the tool shall be used for turning (i.e., the cutting head being stationary), then four different positions for the head are required to be able to index all cutting edges sequentially into active position. In the course of such indexing, the groove row 23A alternately will be in contact with the groove rows 16A and 16B. The same applies for the groove row 23B.

The embodiment of a tool according to the invention shown in FIGS. 5A–6C is a so called helix drill, which comprises a cutting head 41, a drill body 42, a pull rod as well as a nut (not shown).

The cutting head 41 is provided with at least one cutting edge for drilling at the end facing away from the drill body 42. The cutting head 41 is made of hard material, preferably cemented carbide and most preferably of injection molded cemented carbide and comprises two upper clearance surfaces 43, 43', a support surface 22 as well as first and second curved surfaces a pair of curved envelope surfaces 44, 44', and a pair of curved surfaces forming chip flutes 45, 45'. The envelope surfaces and chip flutes connect the clearance surfaces with the support surface. All of these surfaces and associated edges are made of the same material, i.e. preferably injection molded cemented carbide. Lines of intersection between the chip flutes 45, 45' and the clearance surfaces 43, 43' form main cutting edges 46, 46', preferably via reinforcing chamfers, not shown. Lines of intersection between the envelope surfaces 44, 44' and the chip flutes 45, 45' form secondary cutting edges 48, 48'. The chip flutes can alternatively be helical or straight. The cutting head preferably also comprises a coring-out surface, which reaches the center of the cutting head.

The biggest diameter of the cutting head consists of the diametral distance D between the radially extreme points of the secondary cutting edges. The height H of the cutting head is substantially the same as said diametral distance D, in order to minimize the wear from chips acting on joint between the cutting head and the drill body. The biggest diameter of the support surface 16 is preferably less than the biggest diameter of the cutting head, in order to provide clearance during machining. Flushing holes 48, oriented substantially parallel with the rotational axis, run through the cutting head from the support surface 22 to the orifice in respective upper clearance surfaces. The flushing holes are provided on a line L, and are situated on opposite sides of the rotational axis. The function of the drill tool is also described in commonly assigned U.S. application No. 08/945,908 (Swedish Application No. 9501687-9, which hereby is incorporated by reference in the present description as regards the external geometry of the drill and the clamping of the cutting head to the drill body.

The support surface 22 of the cutting head is formed in accordance with the support surface described in connection with FIG. 2B except that the support surface 22 in this case comprises the flushing channels 49 arranged around a central, threaded hole 49' and that the support surface is intersected by the chip flutes. The direction S1 is parallel with the line L and the direction S2 is perpendicular thereto.

The drill body 42, FIGS. 6A–6C, is equipped with flush channels 42A, which follow the protruding lands of the drill along a helical path at a distance from the rotational axis. The drill body has screw shaped or straight chip flutes 42B and these can extend along the entire body or along only a part thereof. The drill body 42 is equipped with a front surface 14 at the end facing towards the cutting head 41, which surface is provided to abut against the support surface 22 of the cutting head 41, such as described above in connection with FIGS. 5A–5C. A difference from to said earlier embodiment of FIGS. 2A–2F is that the grooves in the drill body 42 and the cutting head 41 must be adapted such that the flushing channels and the chip flutes of the drill body are aligned with those of the cutting head.

Figure 7A:
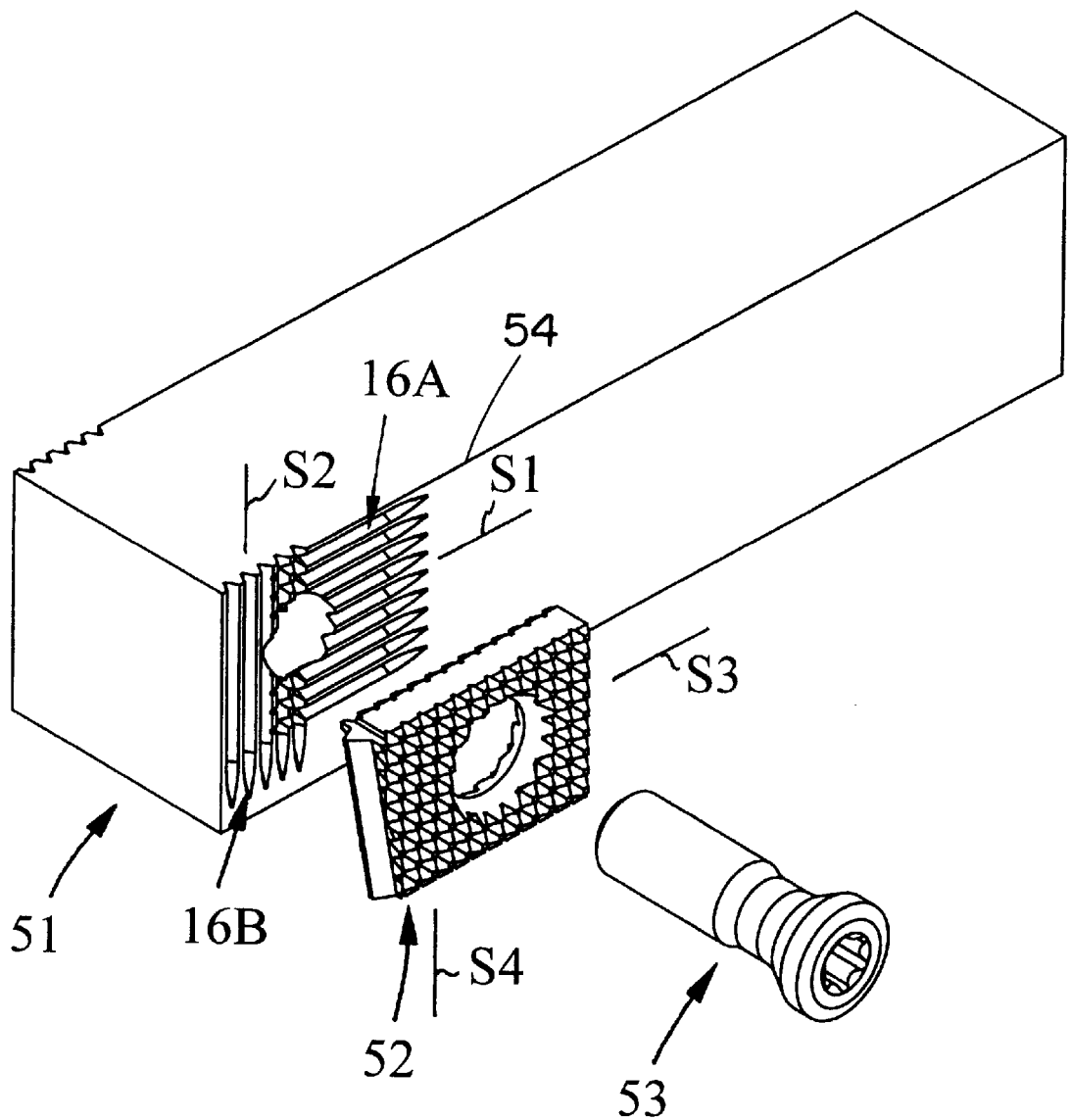
FIGS. 7A–7B show an alternative embodiment of a turning tool for threading or grooving according to the present invention in an exploded view and in a perspective view, respectively.
Figure 7B:
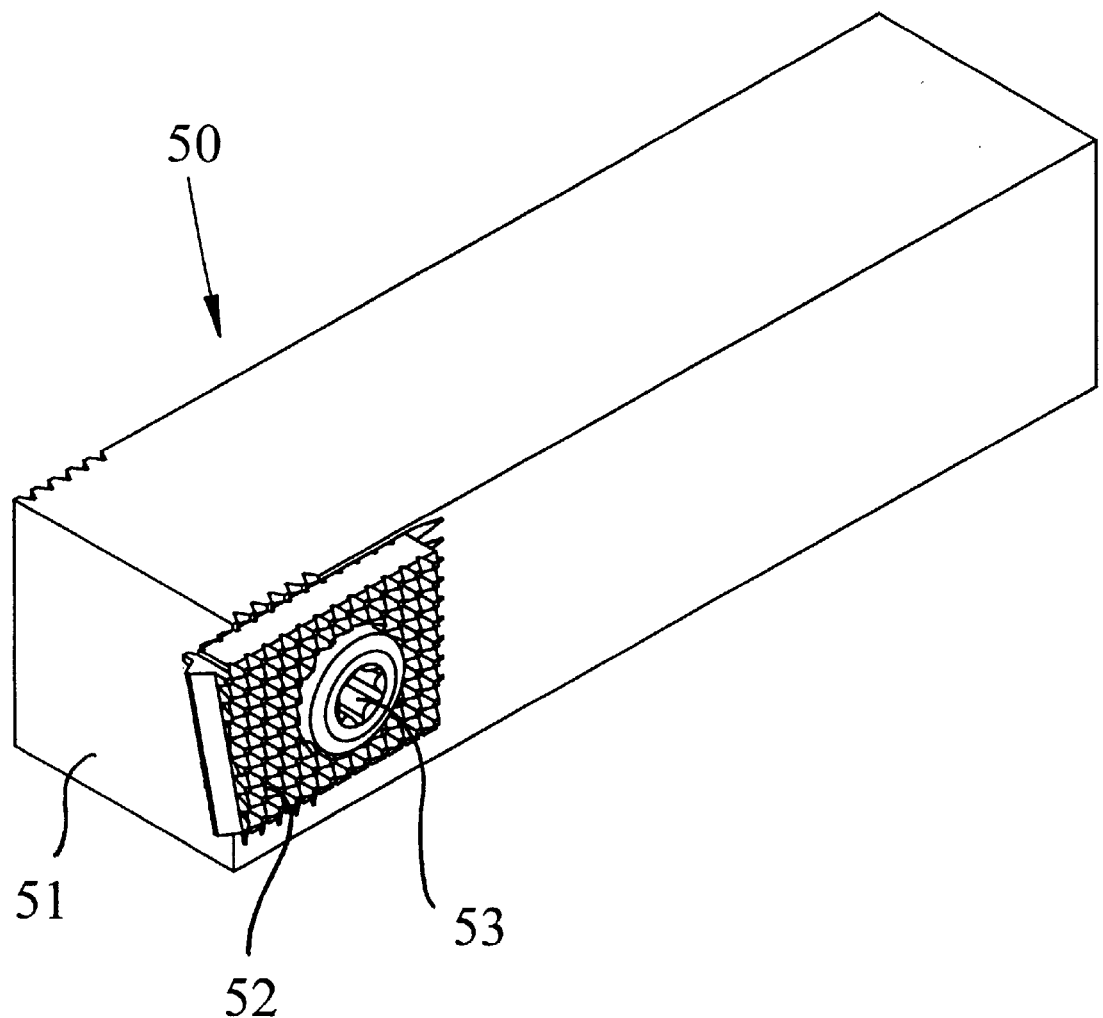

In FIGS. 7A and 7B an additional embodiment of a tool according to the present invention is shown. The tool is a turning tool 50 for example for threading or grooving and comprises a holder 51, a cutting insert 52 and a screw 53. The holder 51 is a rectangular shank having two insert pockets for tangential mounting of the cutting insert. Each cutting insert pocket comprises two groove rows 16A, 16B as explained above in connection with FIG. 2A. However each groove rows 16A, 16B intersects the jacket surface of the holder at only one place, i.e., along an edge 54. The cutting insert 52 is polygonal and is provided with a hole and has broad sides each defined by a grooved support surface as explained in connection with FIG. 2B. The grooves in the groove rows can be parallel and perpendicular, respectively, to an axis of rotation of a work piece or can be angled relative thereto to obtain sufficient clearance when more than one corner portion contains a cutting edge. Since both of the largest surfaces of the cutting insert are provided with groove rows, which occupy the entire surface, the cutting insert can be mounted alternately in right and left cutting insert positions. The tool is mounted by putting the support surface of the cutting insert 52 by hand against the front surface of the holder 51 in one of four possible positions. Thereby the groove direction S3 is aligned with either of the groove directions S1 and S2. The screw 53 is brought through the insert hole and towards a threaded hole in the holder 51. During rotation of the screw via a key which is in engagement with the key grip, the cutting insert will be drawn firmly against the front surface, i.e. the position according to FIG. 7B will have been achieved.

Figure 8A:
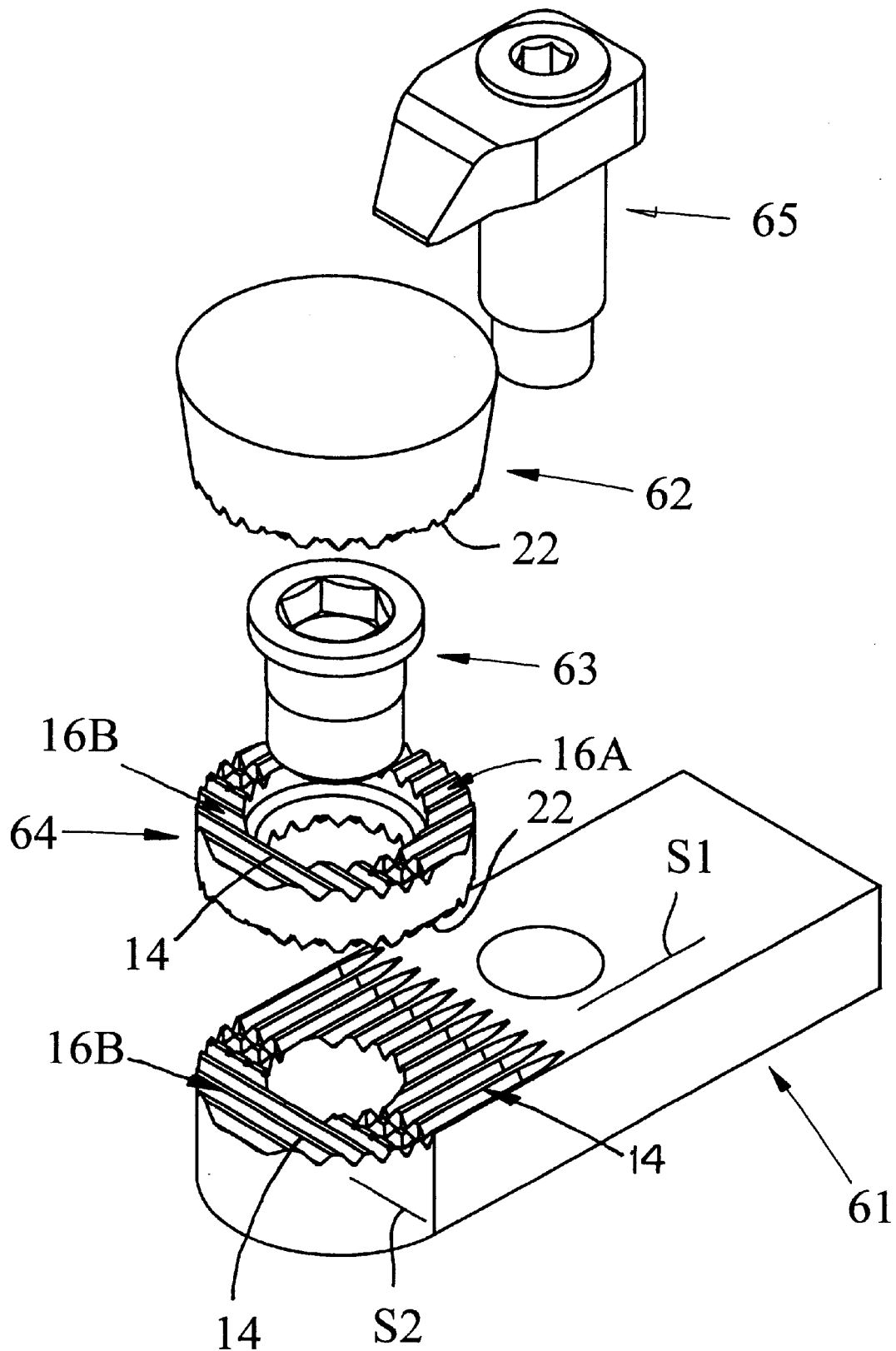
FIGS. 8A–8B show an alternative embodiment of a tool for longitudinal turning according to the present invention, respectively, in an exploded view and in a perspective view.
Figure 8B:
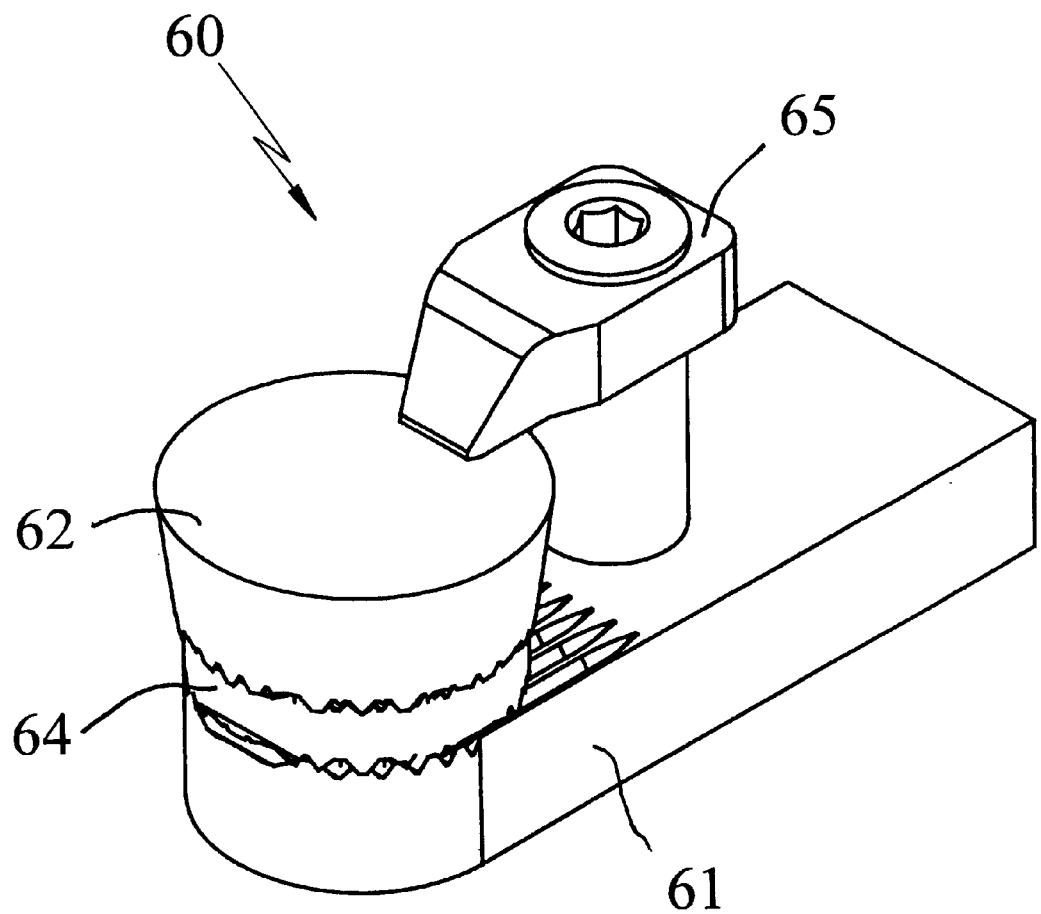
Figure 8C:
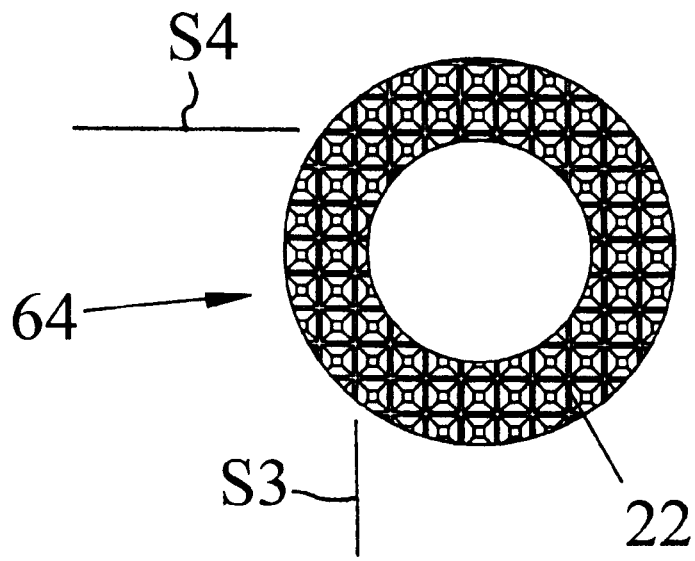
FIG. 8C is a bottom view of a shim according to the invention.
Figure 8D:
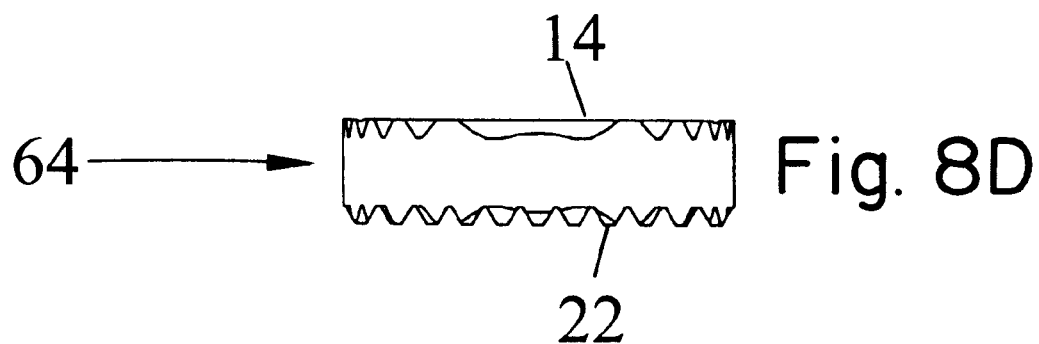
FIG. 8D is a side view of the shim of FIG. 8C.
Figure 8E:
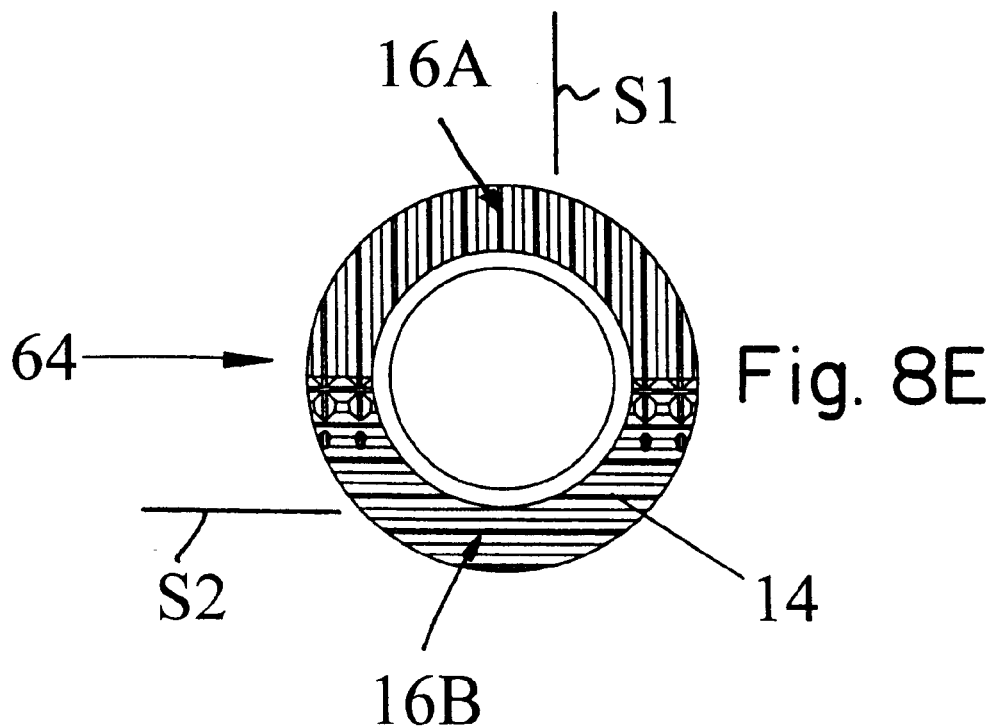
FIG. 8E is a top view of the shim of FIG. 8C.
Figure 8F:
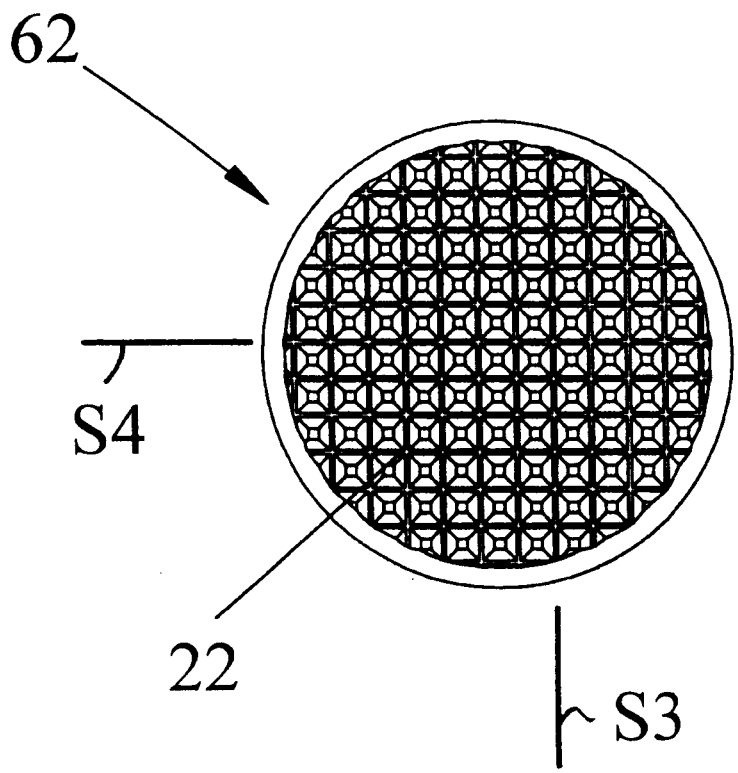
FIGS. 8F–8G show an alternative embodiment of a cutting head according to the present invention in a bottom view and in a side view respectively.
Figure 8G:
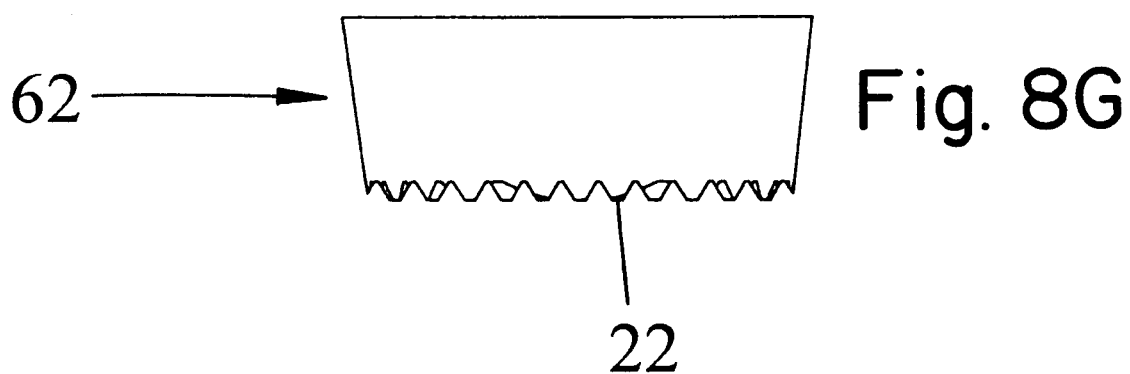

In FIGS. 8A–8G is shown an additional embodiment of a tool according to the present invention. The tool is a tool 60 for longitudinal turning and comprises a holder 61, a round cutting insert 62, a screw 63, a shim 64 and a clamp 65. The holder 61 consists of a rectangular shank and has a position for mounting the shim 64. The position comprises two groove rows 16A, 16B such as explained above in connection with FIG. 2A. The cutting insert 62 is circular and consequently has a round cutting edge and may have somewhat angled clearance surfaces. The lower side of the cutting insert is defined by a support surface 22 such as explained in connection with FIG. 2B, which is more closely shown in FIG. 8C. The grooves in the groove rows 16A, 16B are parallel and perpendicular, respectively, to an axis of rotation of a work piece or obliquely angled relative thereto to obtain sufficient clearance when a polygonal cutting insert for longitudinal turning shall be used. The cutting insert and the shim 64 are preferably made by injection molded cemented carbide. The shim 64 is circular and its underside 22 comprises, like the cutting insert 62, rows of grooves or pyramids. The upper side 14 of the shim 64 is, like the cutting insert position of the holder 61, equipped with two groove rows 16A, 16B. The shim furthermore has a unthreaded through hole. The tool is mounted by putting the lower side of the shim by hand against the holder 61 in one of four possible positions. Thereby the groove direction S3 is aligned with either of the groove directions S1 and S2. The screw 63 is brought through the insert hole and against a threaded hole in the holder 61. During rotation of the screw via a key, the shim is drawn firmly against the front surface of the holder. When the cutting insert 62 shall be mounted the procedure is repeated, namely that the lower side of the cutting insert is put against the upper side of the shim in one of four possible positions. Thereby the groove direction S3 is aligned with either of the groove directions S1 and S2. The clamp 65 firmly clamps the cutting insert in position, whereupon the position according to FIG. 8B is achieved.

In an alternative embodiment the grooves of the upper side of the shim are rotated by 45' in relation to those of the lower side, and therefore such a shim allows the use of four further cutting edge portions on the round cutting insert. Naturally, the upper side of the cutting insert in a double sided embodiment can also comprise a surface which is shown on the lower side of the cutting insert 62 in FIG. 8F, wherein said surface is arranged radially somewhat inside the cutting edge on each side.

Figure 9A:
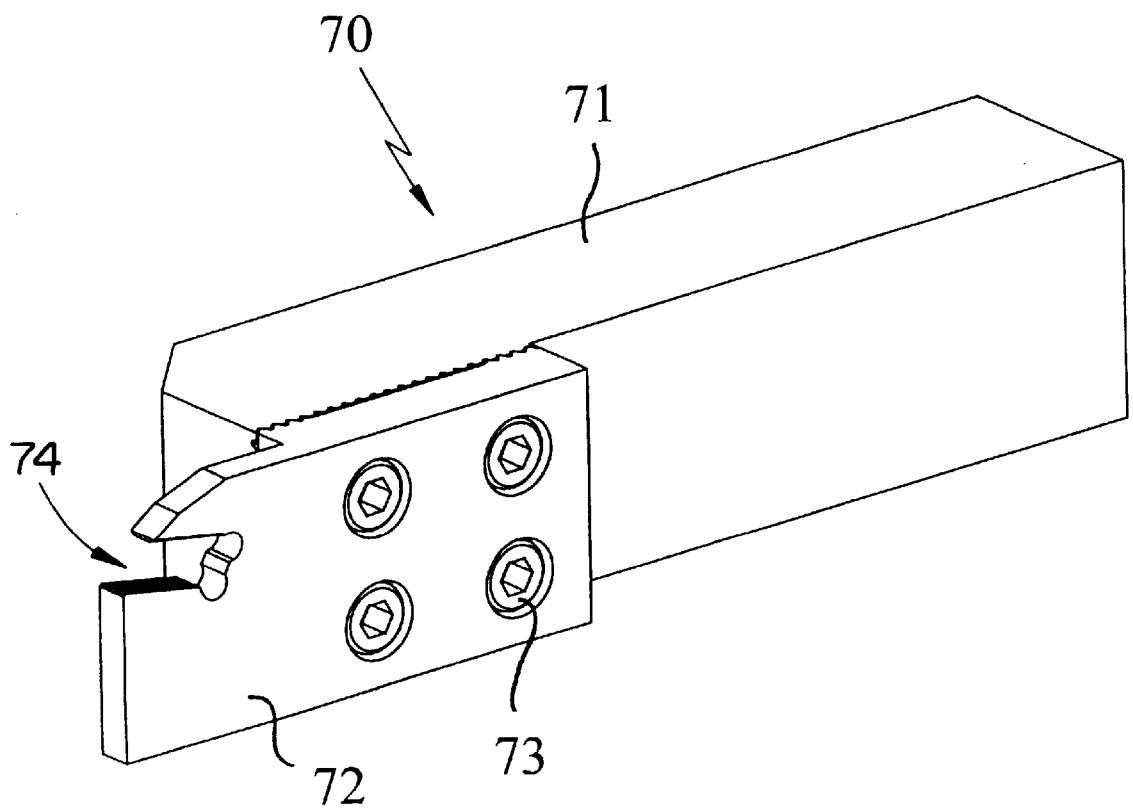
FIG. 9A is a perspective view of a tool holder and insert of an alternative embodiment of the invention used for grooving or parting.
Figure 9B:
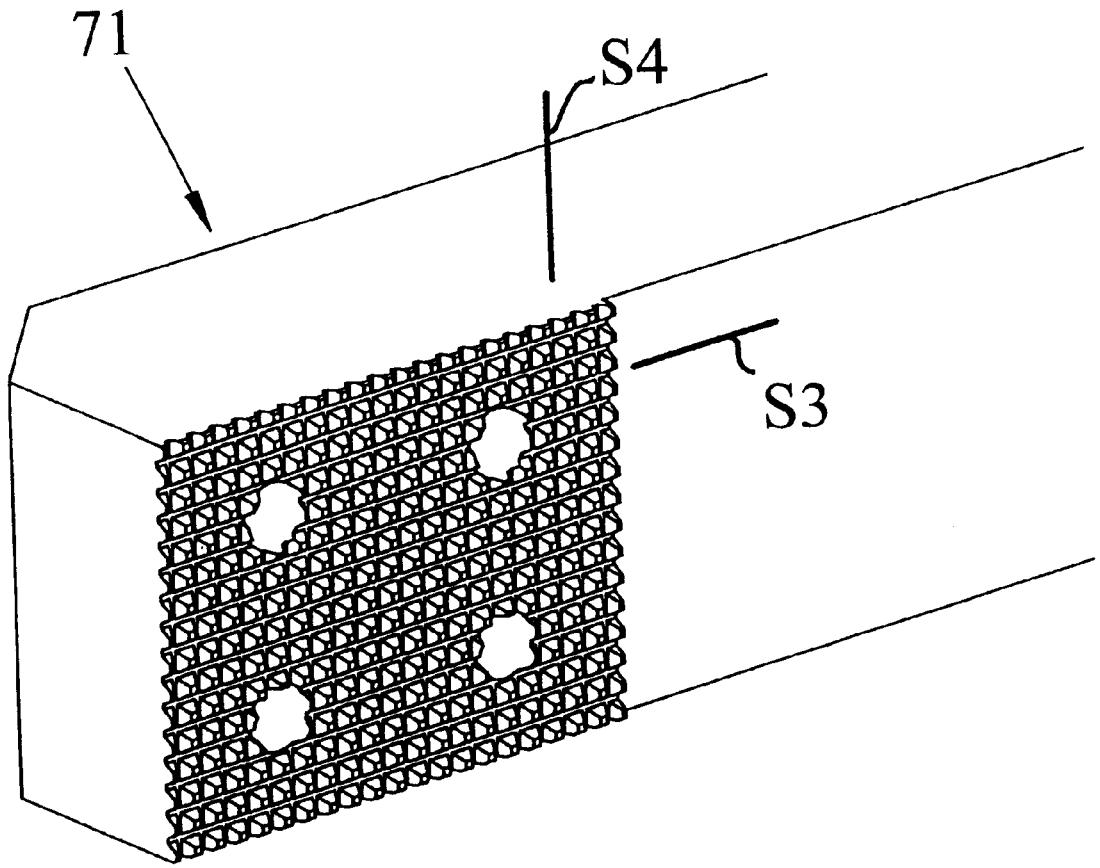
FIG. 9B is a perspective view of the holder of FIG. 9A.
Figure 9C:
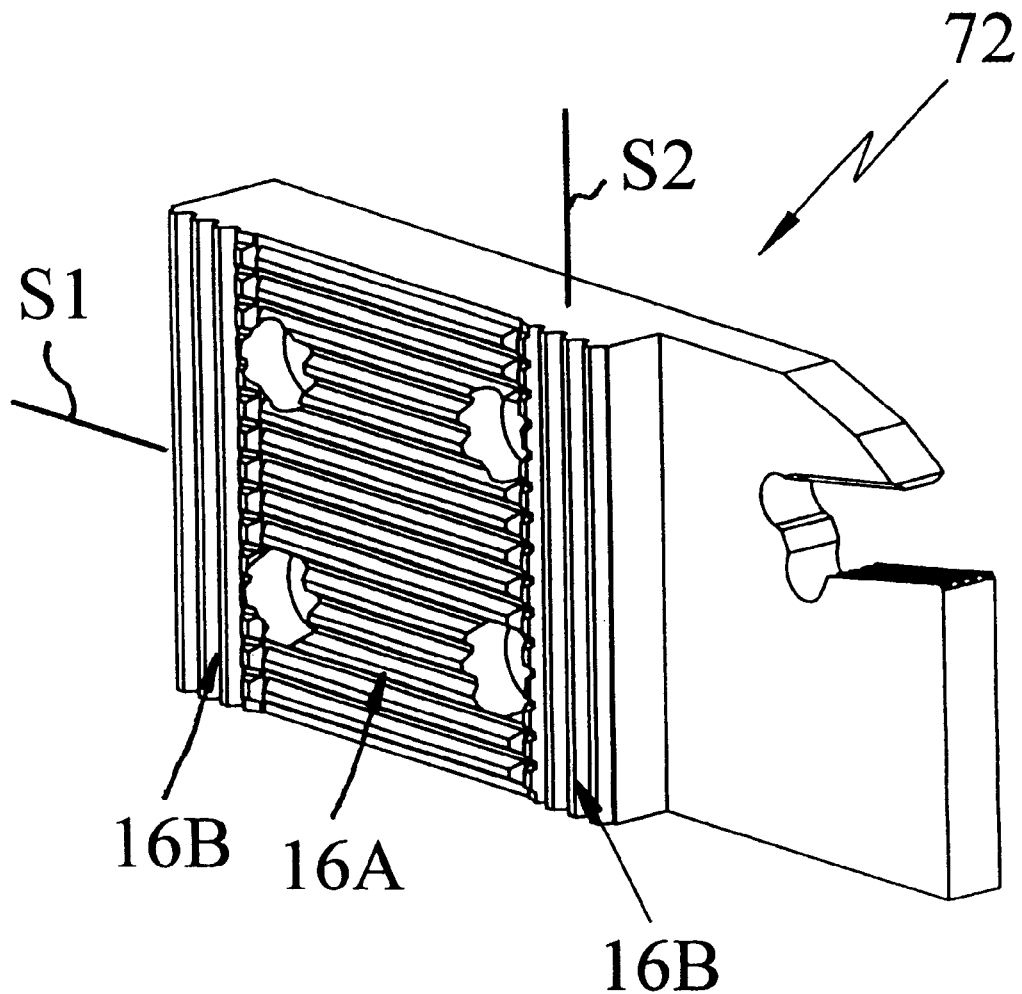
FIG. 9C is a bottom view of a blade type of insert depicted in FIG. 9A.

In FIGS. 9A–9C is shown an additional embodiment of a tool according to the present invention. The tool is a grooving or parting tool 70 and comprises a holder 71, a blade 72, a cutting insert (not shown) and screws 73. The holder 71 comprises a rectangular shank and has a position for mounting of the blade 72. The position comprises two groove rows such as explained above in connection with FIG. 2B, which is more closely shown in FIG. 9B, i.e. two rows of grooves or pyramids arranged perpendicular to each other in the directions S3 and S4. The blade 72 has an inside surface which comprises two groove row 16B which border the groove row 16A in accordance with what has been explained in connection with FIG. 2A. The grooves in the groove rows 16A, 16B are provided parallel and perpendicular, respectively, to the tool's normal feed direction. The blade 72 furthermore has four unthreaded, through holes. The tool is mounted by putting the inside surface of the blade by hand against the position of the holder 71 according to FIG. 9A. Thereby the groove directions S3 and S4 are aligned with the groove directions S1 and S2, respectively. The screws 73 are brought through holes in the blade and against threaded holes in the holder 71. During tightening of the screws the blade will be drawn firmly against the position of the holder 71. Subsequently a cutting insert is pushed into the shown insert pocket 74, whereafter the tool can be used in a machine for turning. An advantage with this tool is that the surfaces on the inside of the blade and on the holder can be machined by one and the same tool, for example by a hob.

The present invention consequently relates to a coupling between two parts for cutting machining which gives a distinct locking effect and allows transfer of large torque simultaneously as the coupling is simpler to manufacture than hitherto known couplings. During use of the coupling in connection with milling, tools of small diameters can be arranged stable and the invention allows simple exchange of cutting heads. During use of the coupling in connection with turning, at least four cutting edges or cutting edge portions can be indexed and be distinctly held.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A chip removing machining device comprising first and second parts having first and second support surfaces, respectively, facing one another;

each of the first and second support surfaces including at least first and second portions, each of the first and second portions having alternating parallel grooves and ridges, the grooves of the first portion being oriented at an angle relative to the grooves of the second portion;

the first and second support surfaces being pressed together to produce a meshing relationship between the ridges of each support surface with the grooves of the other support surfaces;

the first support surface having the first and second portions thereof arranged such that at least some of the grooves of the first portion thereof are in non-intersecting relationship to the grooves of the second portion thereof, and at least some of the grooves of the second portion thereof being in non-intersecting relationship to the grooves of the first portion thereof;

the second support surface having the first and second portions thereof arranged such that a plurality of the grooves of the first and second portions thereof intersect one another.

2. The device according to claim 1 wherein all of the grooves of both of the support surfaces are straight as viewed in a direction perpendicular to the support surface.

3. The device according to claim 2 wherein the first support surface has the grooves of the first portion thereof disposed perpendicular to the grooves of the second portion thereof, and the second support surface has the grooves of the first portion thereof disposed perpendicular to the grooves of the second portion thereof.

4. The device according to claim 1 wherein each of the grooves has a V-shaped cross section.

5. The device according to claim 1 wherein the first and second parts comprise a holder and a cutting head, respectively.

6. The device according to claim 1 wherein the first and second parts comprises a shim and a cutting insert, respectively.

* * * * *